(12) United States Patent
Nadgowda

(10) Patent No.: US 11,100,233 B2
(45) Date of Patent: Aug. 24, 2021

(54) OPTIMIZING OPERATING SYSTEM VULNERABILITY ANALYSIS

(71) Applicant: International Business Machines Corporation, Armonk, NY (US)

(72) Inventor: Shripad Nadgowda, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 16/452,692

(22) Filed: Jun. 26, 2019

(65) Prior Publication Data

US 2020/0410106 A1 Dec. 31, 2020

(51) Int. Cl.
G06F 21/57 (2013.01)
G06F 21/56 (2013.01)

(52) U.S. Cl.
CPC .......... *G06F 21/577* (2013.01); *G06F 21/563* (2013.01); *G06F 21/566* (2013.01); *G06F 2221/033* (2013.01)

(58) Field of Classification Search
CPC .... G06F 21/577; G06F 21/566; G06F 21/563; G06F 2221/033
See application file for complete search history.

(56) References Cited

U.S. PATENT DOCUMENTS

| | | | |
|---|---|---|---|
| 7,424,706 B2 | 9/2008 | Ivanov et al. | |
| 7,845,006 B2 | 11/2010 | Akulavenkatavara et al. | |
| 8,024,807 B2 | 9/2011 | Hall et al. | |
| 9,069,967 B2 | 6/2015 | Wysopal et al. | |
| 10,235,527 B1* | 3/2019 | Dalessio | G06F 16/2379 |
| 2012/0222122 A1* | 8/2012 | Das | G06F 21/577 726/25 |
| 2017/0169229 A1* | 6/2017 | Brucker | G06F 21/566 |
| 2018/0025160 A1* | 1/2018 | Hwang | G06F 8/71 726/25 |
| 2018/0336354 A1 | 11/2018 | Sheridan | |
| 2020/0117808 A1* | 4/2020 | Neystadt | G06F 21/577 |
| 2020/0311281 A1* | 10/2020 | Boulton | G06F 21/552 |

OTHER PUBLICATIONS

Zhang, S., et al., Assessing Attack Surface with Component-Based Package Dependency, International Conference on Network and System Security, pp. 405-417, 2015.
Pewny, J., et al., Leveraging Semantic Signatures for Bug Search in Binary Programs, Proceedings of the 30th Annual Computer Security Applications Conference (ACSAC '14), pp. 406-415, 2014.
Dehlinger, J., et al., SSVChecker: Unifying Static Security Vulnerability Detection Tools in an Eclipse Plug-in, Proceedings of the 2006 OOPSLA Workshop on Eclipse Technology eXchange (Eclipse '06), ACM, pp. 30-34, 2006.

* cited by examiner

*Primary Examiner* — Henry Tsang
(74) *Attorney, Agent, or Firm* — Lieberman & Brandsdorfer, LLC

(57) ABSTRACT

Embodiments relate to an intelligent computer platform to for optimizing operating system vulnerability analysis. A build manifest is parsed and actions associated with operating system packages that contribute to an image build are identified. The identified actions are executed and a minimum build image is created. The minimum image build is scanned and evaluated to identify one or more vulnerabilities present in the minimum image build. Remedial measures are identified and applied to the identified vulnerabilities. The build manifest is executed with the applied remedial measures.

18 Claims, 8 Drawing Sheets

OPTIMIZING OPERATING SYSTEM VULNERABILITY ANALYSIS

BACKGROUND

The present embodiments relate to a system, computer program product, and method for optimizing operating system vulnerability analysis from source code. More specifically, the embodiments relate to identifying vulnerabilities in an image build process without building the image in its entirety.

An image is a result of executing a build command on a build manifest, and it encapsulates an operating environment for an application to run. The act of running the image produces a container, wherein the container is a running instance of the image. Multiple containers can share access to the same underlying image, with each container having its own data state. The container image is an executable package of software that includes everything needed to run an application, including code, runtime system, tools, system libraries, and settings. Container images become containers at runtime. Containers share the operating (O/S) system kernel, and therefore do not require an O/S for each application. Containers virtualize the O/S. Accordingly, multiple containers can run on the same machine and share the O/S kernel with other containers, with each container running as one or more isolated processes in user space.

An O/S vulnerability is a weakness that allows an attacker to reduce a system's information assurance. The O/S vulnerability is the intersection of a system susceptibility or flaw, an attacker having access to the flaw, and an attacker having the capability to exploit the flaw. Any vulnerability in the O/S could compromise the security of the application. By securing the O/S, the environment is stabilized, access to resources is controlled, and external access to the environment is controlled.

SUMMARY

The embodiments include a system, computer program product, and method for optimizing operating system vulnerability analysis from source code.

In one aspect, a computer system is provided with a processing unit and memory for optimizing operating system vulnerability analysis. The processing unit is operatively coupled to the memory and is in communication with the knowledge engine and embedded tools, which include a discovery manager, an image manager, a scan manager, and a remediation manager. The discovery manager functions to parse the build manifest and discover one or more actions determined to impact one or more operating system packages that contribute to build an image. The image manager functions to execute the discovered one or more actions and create a minimum build image. The scan manager functions to scan the minimum image build and evaluate the minimum image build against one or more vulnerabilities. The remediation manager identifies and applies remedial measures to the one or more identified vulnerabilities. The processing unit executes the build manifest with the applied remedial measures.

In another aspect, a computer program device is provided to optimize operating system vulnerability analysis. The program code is executable by a processing unit to optimize operating system vulnerability analysis. The program code parses the build manifest and discovers one or more actions determined to impact one or more operating system packages that contribute to build an image. The program code executes the discovered one or more actions and creates a minimum build image. The program code scans the minimum image build and evaluates the minimum image build against one or more vulnerabilities. The program code further identifies and applies remedial measures to the one or more identified vulnerabilities. The build manifest is executed with the applied remedial measures.

In yet another aspect, a method is provided for optimizing operating system vulnerability analysis. The build manifest is parsed and one or more actions are discovered that impact one or more operating system packages that contribute to building an image. The discovered one or more actions are executed and a minimum build image is created. The minimum image build is scanned and evaluated against one or more vulnerabilities. Remedial measures are identified and applied to the one or more identified vulnerabilities. The build manifest is executed with the applied remedial measures.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment"

means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

An O/S package is an installable application distributed by an O/S vendor. The O/S package contains a hierarchy of files or objects. It is understood in the art that a hierarchy is an organizational technique in which items are layered or grouped to reduce complexity. In one embodiment, one O/S package, referred to herein as a primary or independent package, may call another O/S/package, referred to herein as a secondary or dependent package. Accordingly, understanding and identifying the structure of an O/S package, e.g. a primary package, a hierarchical arrangement of the package, including and any package dependencies, is an important, if not critical, aspect of evaluating the O/S package.

The process shown and described herein identifies the source of operating system (O/S) package vulnerabilities in the build manifest, and only those portions of the build manifest are analyzed for vulnerabilities. As described herein, identifying and remediating O/S vulnerabilities is critical. However, building the image in its entirety raises security concerns or requires special security measures. Accordingly, there is a need to determine O/S vulnerability without create or installing the image.

Figure 1:
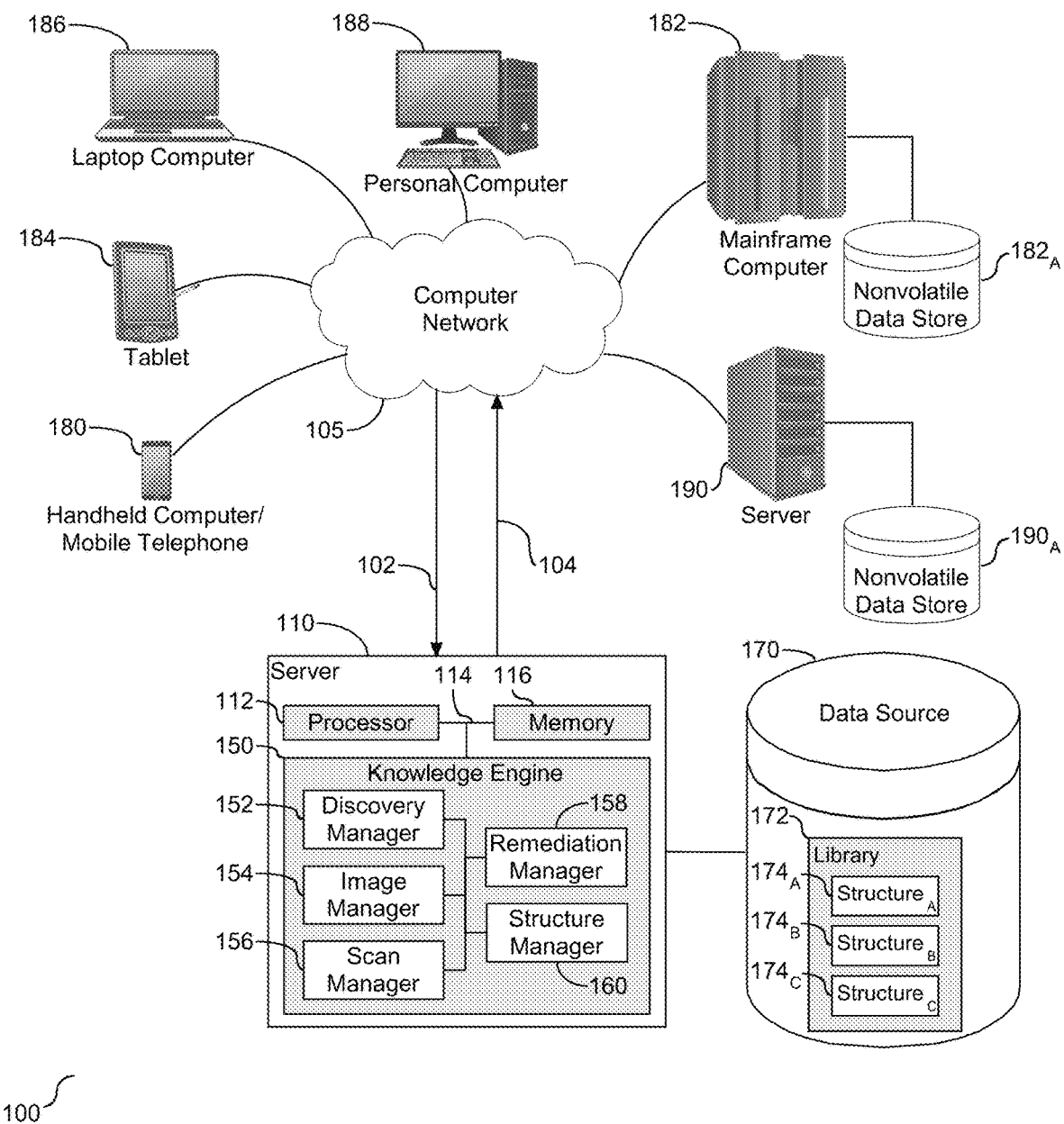
FIG. 1 depicts a system diagram illustrating a computing system to identify and apply remedial measures to a build manifest.

Referring to FIG. 1, a schematic diagram of a computing system (100) is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with a knowledge engine (150) configured to identify and apply remedial measures to a build manifest over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The knowledge engine (150) is shown herein configured with tools to optimize operating system vulnerability analysis from a build manifest. The tools function to identify vulnerabilities in an image build process without building the image in its entirety. The tools include, but are not limited to, a discovery manager (152), an image manager (154), a scan manager (156), a remediation manager (158), and a structure manager (160). The knowledge engine (150) may receive input from the network (105) and leverage a data source (170), also referred to herein as a corpus or data source, to selectively access O/S package data. As shown the data source (170) is configured with at least one library (172) that is populated with one or more organized package structures that are created and managed by the structure manager (160). In the example shown herein, the library (172) is populated with three package structures, shown as structure$_A$ (174$_A$), structure$_B$ (174$_B$), and structure$_C$ (174$_C$). The quantity of structures shown is for illustrative purposes and should not be considered limiting. Details of how the package structures are created is shown and described in FIG. 4. In one embodiment, a package structure is created or populated for each build manifest. Accordingly, the data source (170), which is populated with one or more structures to organize build manifest data, is operatively coupled to the knowledge engine (150).

As shown, the knowledge engine (150) is populated with tools to support the build manifest. An initial aspect is supported by the discovery manager (152) which functions to parse a build manifest, and in one embodiment discover an action which impacts an O/S package. The manifest being parsed may be from one or more of the various computing devices (180), (182), (184), (186), (188), and (190) in communication with the network (105). It is understood in the art that the discovered action contributes to the building of an image. In one embodiment, one or more actions are discovered that impact one or more O/S packages which contribute to the building of the image. The image manager (154), which is shown operatively coupled to the discovery manager, functions to execute the discovered action(s) and create an image build, including a full image build and a partial image build. As shown and described herein, the image manager may limit the image build to a partial image, and not the whole image. In one embodiment, an advantage of a partial image build is limited commitment or utilization of system resources. Accordingly, the discovery manager (152) functions to identify a select set of actions in the manifest, and the image manager (154) functions to build a partial image using the select set of actions.

The partial image is subject to a scan to check the partial image for the presence of any vulnerabilities. As shown herein, the scan manager (156), which is operatively coupled to the image manager (154), performs the partial image scan. The image scan is directed to identifying presence of any vulnerabilities that can compromise the security of the application. For example, in one embodiment, the scan manager (156) identifies vulnerabilities by utilizing an existing image based vulnerability scanner to perform a vulnerability analysis on the identified set of actions present in the partial image build. It is understood in the art that some vulnerabilities may have a corresponding remediation that when applied to the vulnerability will mitigate, if not eliminate, the vulnerability. For example, in one embodiment, the remediation may be known as a patch or fix to improve security, and in one embodiment, to add new features. In one embodiment, the patch is an immediate fix or correction to an identified problem, such as a coding error. Patches may fall into one of the following categories: bug fix patches, security patches, and feature patches. In general, the bug fix patch corrects problems in the software, and in one embodiment help the software run more smoothly and reduce the likelihood of an error. The security patch addresses one or more known security vulnerabilities, and provides an immediate solution to provide security. The feature patch functions to eliminate or mitigate weakness associated with the vulnerability. In one embodiment, the scan manager (156) leverages a vulnerability database to identify possible remedial measures. The remediation manager (158) applies the identified remedial measure, e.g. patch, to the corresponding vulnerability. Accordingly, the remediation manager (158) functions to the scan manager (156) to apply one or more remediating solutions to one or more corresponding and identified vulnerabilities.

As shown, the structure manager (160) is operatively coupled to the discovery manager (152). The functionality of the structure manager (160) includes building one or more structures, and in one embodiment managing one or more previously built structures. Once built, the structure is applied by the discovery manager (152) for analysis, either static or dynamic, and referred to collectively herein as analysis, of a build manifest of an image. The analysis is performed by the discovery manager (152) occurs without executing the actions associated with the O/S packages and without building the image or partial image. The structure manager (160) identifies the O/S providing support for the manifest. In one embodiment, the identified O/S is referred to as a primary O/S. In addition, the structure manager (160) leverages the identified O/S and consults one or more publishing sites or secondary locations for the identified O/S system, and leverages the site(s) to identify all O/S packages that are supported by the identified O/S. The structure manager (160) further consults the publishing site for all secondary O/S packages that are supported by the identified O/S package(s). The structure manager (160) populates the corresponding structure with any identified secondary O/S packages, and creates an association between the primary O/S package and any identified secondary O/S packages. In one embodiment, the association reflects the dependent relationship of the secondary O/S package(s) and the primary package. The structure manager (160) documents and reflects the identified association between or among packages in the corresponding structure, and stores the structure with the identified O/S packages and their hierarchical relationships in the data source (170).

As shown and described, the structure manager (160) is responsible for building one or more structures and storing the structures in the data source (170). In one embodiment, the structure may be stored in the data source (170) and leveraged to utilize the identified O/S package(s) therein. The structure manager (160) organizes how structures are stored in the data source (170). As shown herein, the data source (170) includes one or more libraries (172) with each library storing one or more structures, shown herein as ($174_A$)-($174_C$). In one embodiment, the libraries may be organized by identifying characteristics. The structures ($174_A$)-($174_C$) are assigned to a specific library, e.g. library (172), by the structure manager (160) to facilitate identification of the structure. In one embodiment, the structures ($174_A$)-($174_C$) are grouped or logically grouped into a corresponding library, e.g. library (172). The discovery manager (152) consults the build manifest and identifies characteristic data associated with the manifest, e.g. manifest metadata. The discovery manager (152) leverages the manifest characteristic data to ascertain, and in one embodiment, identify a library (172) and corresponding and previously built structures ($174_A$)-($174_C$) that is related to the manifest. The discovery manager (152) leverages the data within the structures ($174_A$)-($174_C$) to generate a list of O/S packages that contribute to the image build, thereby employing the knowledge from a prior image build. Accordingly, the structure manager (160) assigns the structures ($174_A$)-($174_C$) to a specific library (172), and the discovery manager (152) leverages the structures ($174_A$)-($174_C$) to generate a list of O/S packages that contribute to the image build.

It is understood that vulnerabilities are transient and evolve over time. Although an O/S package identified in a structure may not have been previously subject to a vulnerability at the time the structure was created or amended, it is understood that a vulnerability assessment need to be current. The scan manager (156) analyzes the O/S packages identified by the discovery manager (152), with the analysis identifying any vulnerabilities present in the identified primary and secondary O/S packages. In one embodiment, the identified O/S packages are organized in a list or similar organization format. The vulnerability analysis limits computer resources by restricting the analysis to O/S packages that contribute to the image build. It is understood that the vulnerability analysis may identify one or more vulnerabilities associated with the one or more of the identified packages, or in one embodiment, the vulnerability analysis may not identify any vulnerabilities. In the case of identification of at least one vulnerability, the remediation manager (158) leverages a vulnerability database to identify if there are any known or available remedial measures for each of the vulnerabilities identified by the scan manager (156). In one embodiment, the vulnerability database is an external database, e.g. public. The remediation manager applies the identified remedial measure(s) to each identified vulnerability and corresponding O/S package. Application of the identified remedial measure(s) enables the build manifest to be executed without the presence of any of the identified vulnerabilities. Accordingly, as shown and described, the tools (152)-(160) support and enable vulnerability analysis and selective application or remedial measures to one or more if the identified vulnerabilities without building the image or installing the O/S package(s).

As shown, the network (105) may include local network connections and remote connections in various embodiments, such that the knowledge engine (150) may operate in environments of any size, including local and global, e.g. the Internet. Additionally, the knowledge engine (150) serves as a front-end system that can make available a variety of knowledge extracted from or represented in network accessible sources and/or structured data sources. In this manner, some processes populate the knowledge engine (150), with the knowledge engine (150) also including input interfaces to receive requests and respond accordingly.

The data source (170) is populated with at least one library (172) and corresponding logically grouped package structures ($174_A$)-($174_C$) for use by the knowledge engine (150). In one embodiment, the data source (170) may be configured with other or additional sources of input and, as such, the sources of input shown and described herein should not be considered limiting. Similarly, in one embodiment, the data source (170) includes structured, semi-structured, and/or unstructured content related to activities and tasks. The various computing devices (180)-(190) in communication with the network (105) may include access points for the logically grouped libraries and structures.

The network (105) may include local network connections and remote connections in various embodiments, such that the knowledge engine (150) may operate in environments of any size, including local and global, e.g. the Internet. Additionally, the knowledge engine (150) serves as a front-end system that can make available a variety of knowledge extracted from or represented in network accessible sources and/or structured data sources. In this manner, some processes populate the knowledge engine (150), with the knowledge engine (150) also including one or more input interfaces or portals to receive requests and respond accordingly.

The knowledge engine (150), via a network connection or an internet connection to the network (105), is configured to detect and manage network activity and task data as related to identify presence or associated of any vulnerabilities in corresponding O/S packages. The knowledge engine (150) may effectively orchestrate or optimize an orchestrated sequence of actions directed at related activity data by leveraging the data source (170), which in one embodiment may be operatively coupled to the server (110) across the network (105).

Activity data, e.g. published platform data, received across the network (105) may be processed by a server (110), for example IBM Watson® server, and the corresponding knowledge engine (150). As shown herein, the knowledge engine (150) together with the embedded managers (152)-(160) parse a build manifest, discover actions that may impact or otherwise effect a corresponding O/S package, and perform an analysis to identify any known vulnerabilities for the corresponding O/S package, and dynamically identify and apply remedial measures to the identified vulnerabilities, so that the build manifest may be executed with the applied remediation measures. Accordingly, the tools (152)-(160) function to identify and apply remediation techniques prior to execution of the build manifest.

In some illustrative embodiments, the server (110) may be the IBM Watson® system available from International Business Machines Corporation of Armonk, N.Y., which is augmented with the mechanisms of the illustrative embodiments described hereafter. The managers (152)-(160), hereinafter referred to collectively as tools, are shown as being embodied in or integrated within the knowledge engine (150) of the server (110). The tools may be implemented in a separate computing system (e.g., 190), or in one embodiment they can be implemented in one or more systems connected across network (105) to the server (110). Wherever embodied, the tools function to dynamically evaluate platform activity data to optimize content publication.

Types of devices and corresponding systems that can utilize the knowledge engine (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various devices and systems can be networked together using computer network (105). Types of computer network (105) that can be used to interconnect the various devices and systems include Local Area Networks (LANs), Wireless Local Area Networks (WLANs), the Internet, the Public Switched Telephone Network (PSTN), other wireless networks, and any other network topology that can be used to interconnect the devices and systems. Many of the devices and systems include nonvolatile data stores, such as hard drives and/or nonvolatile memory. Some of the devices and systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various devices and systems or can be internal to one of the devices and systems.

The device(s) and system(s) employed to support the knowledge engine (150) may take many forms, some of which are shown in FIG. 1. For example, an information handling system may take the form of a desktop, server, portable, laptop, notebook, or other form factor computer or data processing system. In addition, the device(s) and system(s) may take other form factors such as a personal digital assistant (PDA), a gaming device, ATM machine, a portable telephone device, a communication device or other devices that include a processor and memory.

Figure 2:
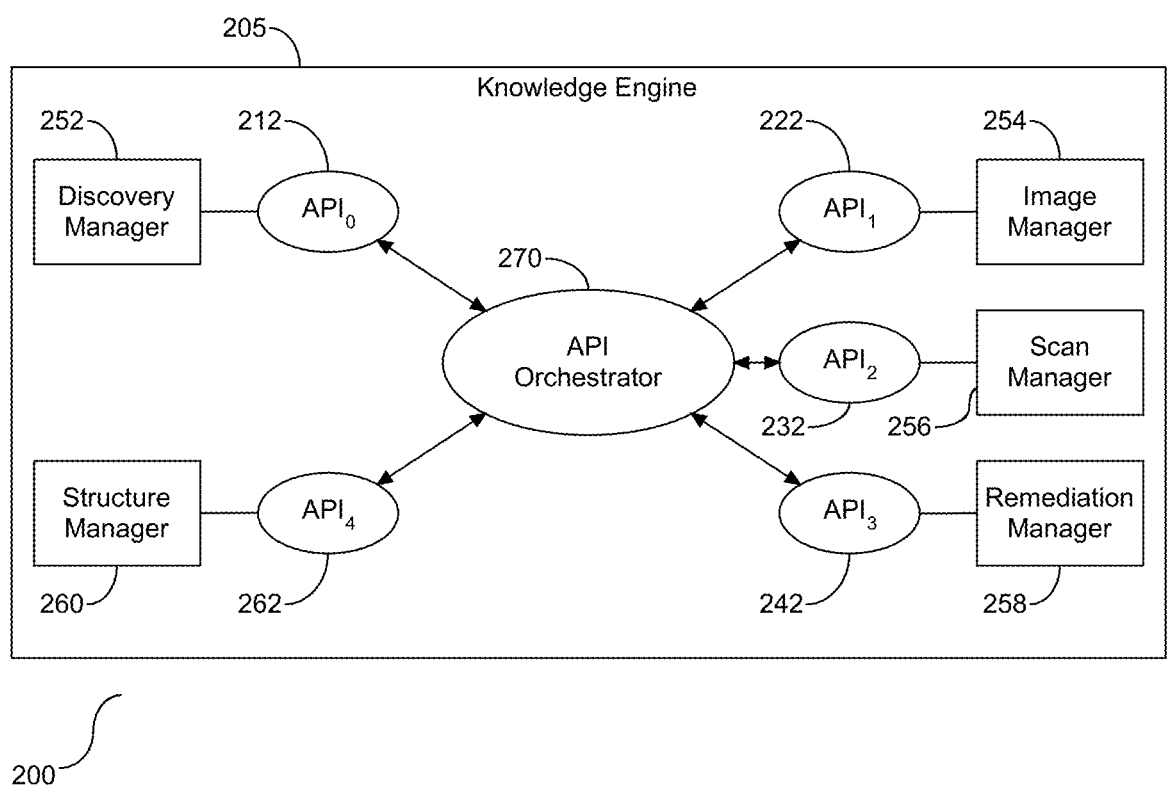
FIG. 2 depicts a block diagram illustrating the tools from the computing system and their associated Application Program Interface.

An Application Program Interface (API) is understood in the art as a software intermediary between two or more applications. With respect to the knowledge engine (150) shown and described in FIG. 1, one or more APIs may be utilized to support one or more of the tools (152)-(160) and their associated functionality. Referring to FIG. 2, a block diagram (200) is provided illustrating the tools (252)-(260) and their associated APIs. As shown, a plurality of tools are embedded within the knowledge engine (205), with the tools including the discovery manager (152) shown herein as (252) associated with $API_0$ (212), the image manager (154) shown herein as (254) associated with $API_1$ (222), the scan manager (156) shown herein as (256) associated with $API_2$ (232), the remediation manager (158) shown herein as (258) associated with $API_3$ (242), and the structure manager (160) shown herein as (260) associated with $API_4$ (262). Each of the APIs may be implemented in one or more languages and interface specifications. $API_0$ (212) provides functional support to parse a build manifest and to discover an action which impacts an O/S package; $API_1$ (222) provides functional support to execute the discovered action(s) and create a partial image build; $API_2$ (232) provides functional support to scan the partial image to identify the presence of any vulnerabilities; $API_3$ (242) provides functional support to identify apply remediating solutions to the corresponding vulnerabilities; and $API_4$ (252) provides functional support to build one or more package structures. As shown, each of the APIs (212), (222), (232), (242) and (252) are operatively coupled to an API orchestrator (270), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
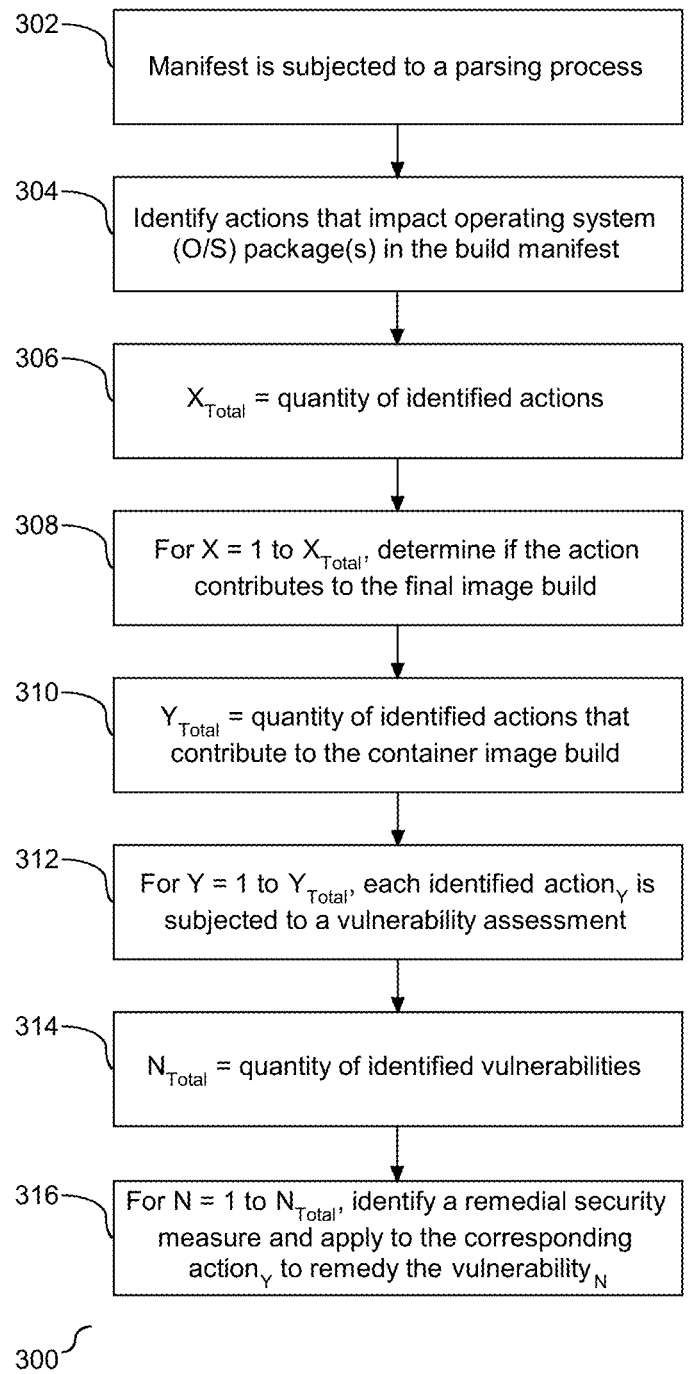
FIG. 3 depicts a flow chart illustrating a process for identifying vulnerabilities based on a partial image build of a container.

Referring to FIG. 3, a flow chart (300) is provided illustrating a process for identifying O/S packages and corresponding vulnerabilities, and identifying and applying remediation protocols to the corresponding O/S packages based on a partial image build of a container. As shown and described, the process scans a partial build image to identify vulnerabilities in operating system (O/S) packages. The vulnerabilities are identified without building the whole image, e.g. a partial image build, thereby limiting system resource utilization. A build manifest, hereinafter referred to as a manifest, is the list of commands used to build the image for either a partial or whole image build. The manifest is parsed or otherwise subject to a parsing process (302). The parsing at step (302) is leveraged to identify any actions that impact an O/S package(s) that are reflected or otherwise apparent in the build manifest (304). It is understood in the art, that in general there is at least one action in the build manifest that relates to the O/S package(s). The variable $X_{Total}$ is assigned to represent a quantity of actions identified from the manifest that impact the O/S package (306). An analysis is performed to determine if the action, e.g. $action_X$, contributes to the final image build (308). In one embodiment, the analysis at step (308) is a static analysis that uses one or more static rules to assess the action contribution to the final image build. The variable $Y_{Total}$ is assigned to represent the number of identified actions that contribute to the container image build (310), which in one embodiment may be a subset of the actions $X_{Total}$. Accordingly, the initial assessment is directed at determining actions within a package that are associated with the container image build.

It is understood that a partial image build is less than the entire image build, with the goal of limiting system resources. In one embodiment, the partial image build is directed to a subset of actions associated with O/S packages identified in the manifest, such as those actions that contribute to the container image build. Following step (310), the identified actions, $Y_{Total}$, within the package(s) are subject to a vulnerability assessment. As shown, each identified action$_Y$ is subject to a scan or equivalent process to identify if there are any apparent, or in one embodiment non-apparent, vulnerabilities or security concerns associated with action$_Y$ (312). It is understood that building the entire image is unnecessary and reviewing all of the actions associated with building the entire image is cumbersome and utilizes an excess quantity of resources. The focus is directed at scanning those actions determined to contribute to the final image build for the initial vulnerability analysis. Following step (312), the variable $N_{Total}$ is assigned to represent the number of identified vulnerabilities (314). For each returned vulnerability$_N$, a remedial security measure is identified and applied to the corresponding action$_Y$ to remedy the vulnerability$_N$ (316). In one embodiment, the remediation may be application of a security patch. Accordingly, as demonstrated only those actions determine to contribute the final image build are subject to the vulnerability analysis to identify and remediate O/S package vulnerabilities.

Figure 4:
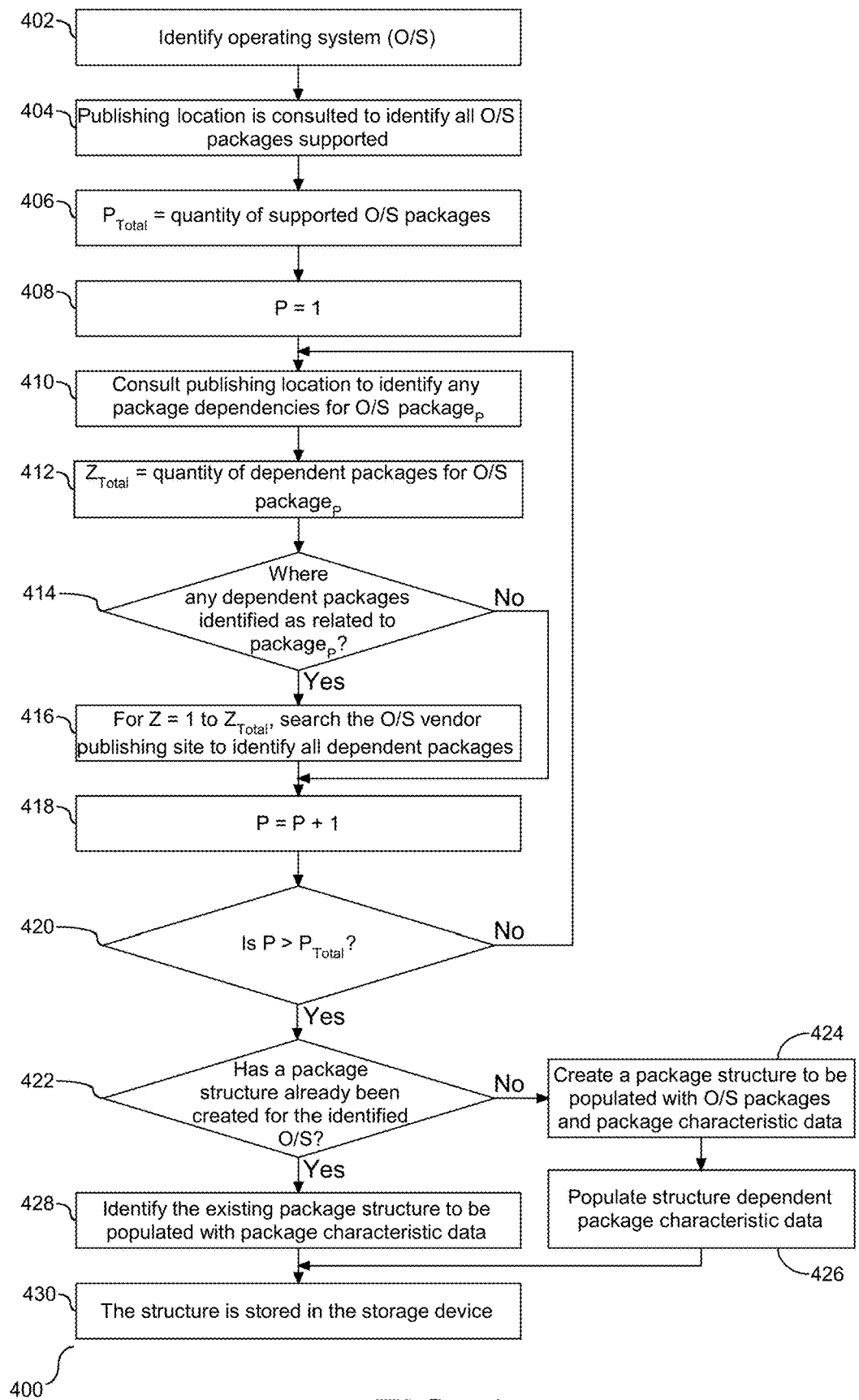
FIG. 4 depicts a flow chart illustrating a process for building an organized package structure.

The process in FIG. 3 demonstrates a process for reviewing the manifest while limiting the vulnerability remediation processing, which requires less resources from the computing system than subjecting the entire manifest to vulnerability identification and remediation. Analysis of a package to detect vulnerabilities is possible without building the image. In one embodiment this analysis can be performed statically without building an image by extrapolating list of O/S packages from build manifest, while in other embodiment this can be achieved dynamically by performing a partial image build. More specifically, the analysis of a package identifies third party presence of vulnerabilities in O/S packages identified in the manifest that contribute to the build of the image. The analysis is performed without executing the actions associated with the O/S packages and without building the image or a partial image. In one embodiment, a remedial action is applied to the identified vulnerability without executing the build manifest. Referring to FIG. 4, a flow chart (400) is provided illustrating a process for building a package structure to support the analysis. The build manifest is supported by an operating system. The O/S system is identified (402), and the publishing location or library for the O/S is consulted to identify all O/S packages supported by the identified O/S for the manifest (404). The variable $P_{Total}$ is assigned to represent the quantity of supported O/S packages (406). A corresponding O/S package counting variable is initialized (408). It is understood in the art that the build manifest will identify at least one O/S, and the O/S will support at least one O/S package. An O/S package may be classified as an independent package or a dependent package. The independent O/S package does not require or depend on a call from another package. However, a dependent package is an O/S package or package component that either requires or depends on a call from another package. Accordingly, the initial aspect of building the structure is directed at O/S and O/S package identification.

A publishing location or library for O/S is consulted to identify any package dependencies for O/S package$_P$ (410). The variable $Z_{Total}$ is assigned to represent the number of dependent packages that are identified for each O/S package$_P$ (412). It is understood that there may not be any dependent packages. Following step (412), it is determined if any dependent packages were identified as related to package$_P$ (414). If the determination at step (414) is positive, then the O/S vendor publishing site is searched to identify all of the dependent packages, e.g. from 1 to $Z_{Total}$, for O/S package$_P$ (416). At the conclusion of step (416), or if the response to the determination at step (414) indicates that there are no dependent packages for O/S package$_P$, then the package counting variable P is incremented (418). It is then determined if all of the primary O/S packages have been evaluated (420). A negative response to the determination at step (420) returns the process to step (410), and a positive response to the determination at step (420) concludes the process of identifying dependent secondary O/S packages. Accordingly, prior to constructing and organizing a package structure, the primary packages, e.g. packages directly called in the build manifest, are analyzed to identify any dependent packages.

Following step (420), the process of constructing and organizing the package structure takes place, or in one embodiment, amending an existing package structure. It is determined if a package structure has already been created for the identified operating system (422). In one embodiment, the library (172) is organized by operating systems or categories of operating systems. A negative response to the determination at step (422) is followed by building a data structure, or in one embodiment, creating a structure to be populated with O/S packages and corresponding package characteristic data (424). For each identified O/S package, the structure is populated with characteristic data pertained to the package and package characteristics. In one embodiment, the package characteristic(s) include, but are not limited to, O/S type, O/S version, architecture, package name, and package version. In addition, for each identified O/S package$_P$, each of the identified dependent packages, e.g. package$_z$, and dependent package characteristic data is populated into the structure and identified as corresponding or related to the primary package (426). A positive response to the determination at step (422) is followed by identifying the created structure and populating the structure with identified primary and secondary packages and package characteristics that are not already populated into the structure (428). After the structure has been populated with the package and package dependency data as shown at steps (424)-(428), the structure is stored in a storage device or corresponding library (430). In one embodiment, the structure is stored in the data source (170), as shown and described in FIG. 1. Accordingly, a new structure is created or an existing structure is amended with O/S characteristic data, thereby enabling the structure to support identification of packages and package dependencies, together with the corresponding package metadata.

Figure 5:
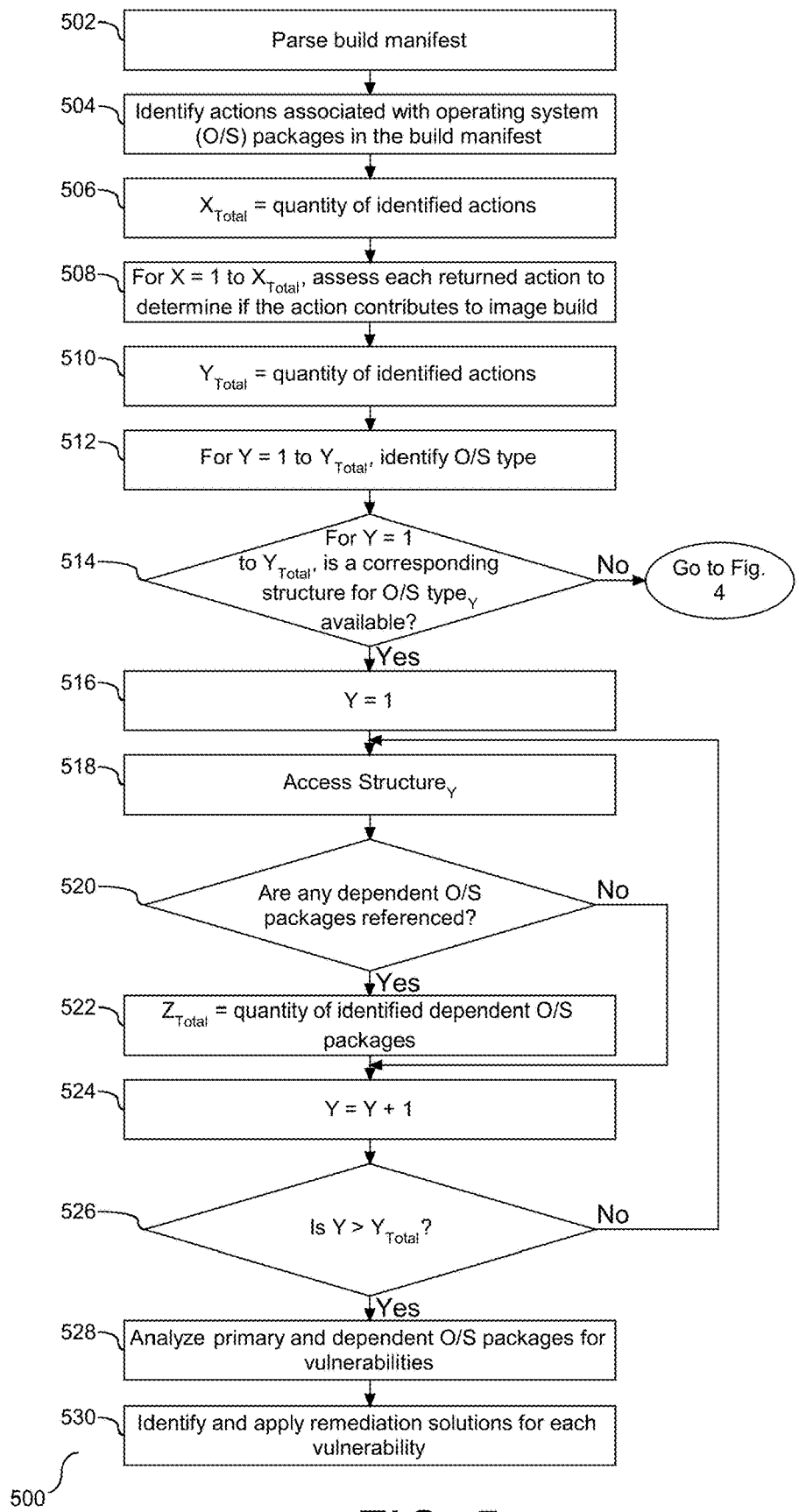
FIG. 5 depicts a flow chart illustrating utilizing the organized package structure to identify vulnerabilities in the build manifest.

Once created, the structure may be leveraged, or otherwise utilized, to share the knowledge organized therein. Referring to FIG. 5, a flow chart (500) is provided illustrating a process for utilizing the created or amended organized package structure, as shown in FIG. 4, to identify vulnerabilities in the build manifest. Similar to FIG. 3, the build manifest is parsed (502), and any actions associated with O/S packages in the build manifest are identified (504). As shown and described in FIG. 3, the variable $X_{Total}$ is assigned to represent the number of identified actions from the manifest that impact the O/S package (506). Each returned action$_X$ is assessed to determine if the action contributes to the image build (508). As shown and described in FIG. 3, the variable $Y_{Total}$ is assigned to represent the number of actions that contribute to the container image build (510). For each returned action$_Y$, a corresponding O/S type, e.g. O/S type$_Y$, is identified (512). The data source (170), or a corresponding structure storage location, is queried to ascertain if a corresponding structure for O/S type$_Y$ is present and available (514). A negative response to the determination at step (514) is followed by a return to FIG. 4 to create a corresponding structure for O/S type$_Y$. Accordingly, the O/S type and any corresponding structures are identified.

Following a positive response to the determination at step (514) or completion of the structure from FIG. 4, the variable Y, representing the action that contributes to the container image build, is initialized (516), and the corresponding structure, e.g. structure$_Y$, is accessed (518). The organized structure, also referred to herein as a data structure, is searched to ascertain and identify any previously referenced dependent O/S packages (520), e.g. determine if there are any dependent packages referenced in the structure. A positive response at step (520) is followed by assigning the variable $Z_{Total}$ to represent the number of identified dependent O/S packages (522). At the conclusion of step (522), or upon a negative response at step (520), the counting variable Y is incremented (524) and it is determined if there are any remaining O/S$_Y$ subject to evaluation for dependent packages (526). A negative response at step (526) is followed by a return to step (518), and a positive response to the determination at step (526) concludes the process of identifying dependent packages.

Following a positive response to the determination at step (526), the primary O/S packages and dependent O/S packages are analyzed for vulnerabilities (528). For each identified vulnerability, remediating solutions, e.g. patches, are identified and applied to the package (530) so that the build manifest can be executed with the applied remedial measure. Accordingly, as demonstrated an analysis of the image is performed to identify O/S package vulnerabilities without building the image in its entirety, e.g. a partial image build, with the image building taking place in its entirety after the remediation actions for the identified O/S packages and corresponding vulnerabilities have been applied.

Embodiments shown and described herein may be in the form of a computer system for use with an intelligent computer platform for providing optimization of operating system vulnerability analysis from a build manifest, e.g. source code. Aspects of the tools (152)-(160) and their associated functionality may be embodied in a computer system/server in a single location, or in one embodiment, may be configured in a cloud based system sharing computing resources. With references to FIG. 6, a block diagram (600) is provided illustrating an example of a computer system/server (602), hereinafter referred to as a host (602) in communication with a cloud based support system (610), to implement the system, tools, and processes described above with respect to FIGS. 1-4. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments where tasks are performed by remote processing devices that are linked through a communications network. In a distributed cloud computing environment, program modules may be located in both local and remote computer system storage media including memory storage devices.

Figure 6:
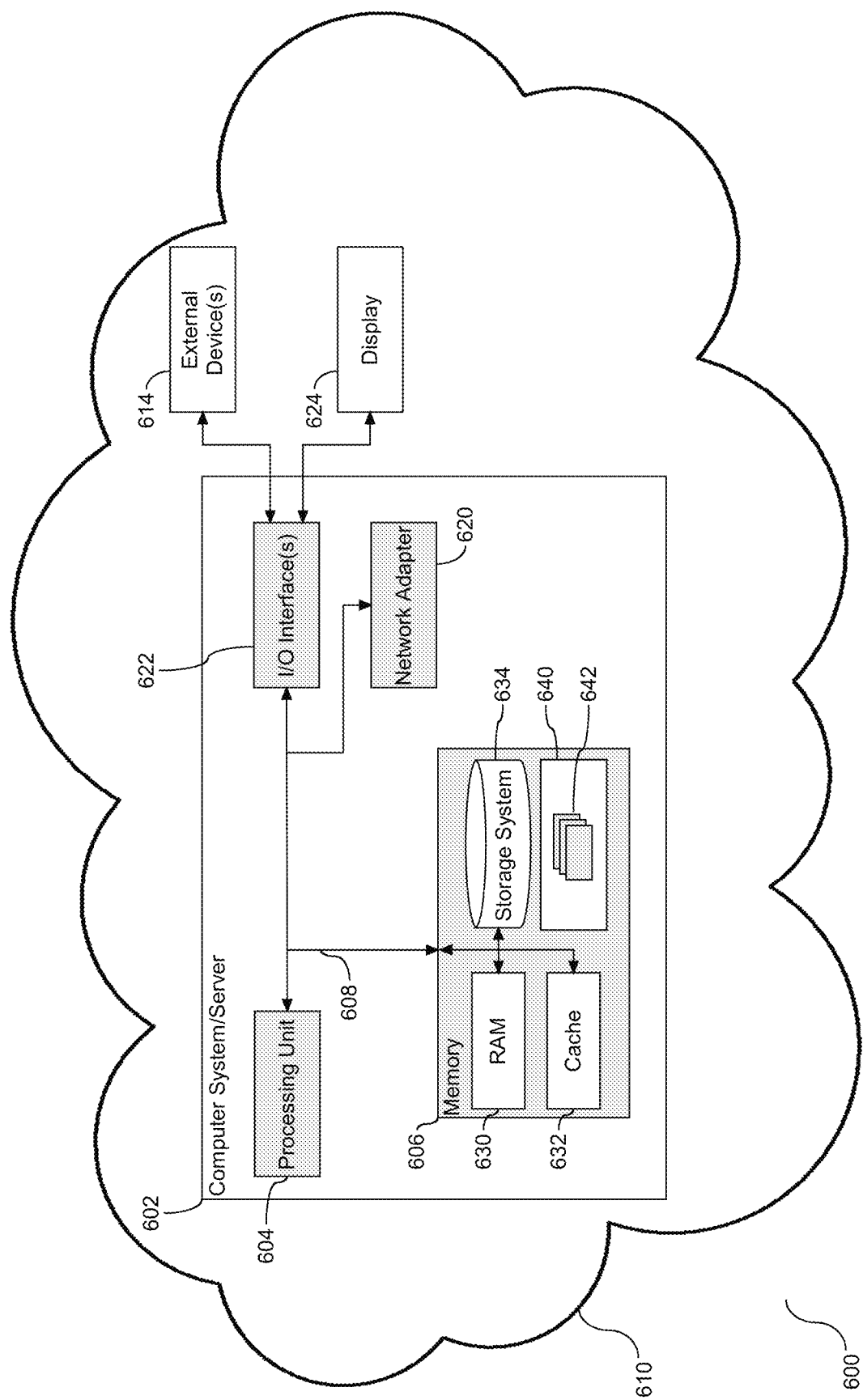
FIG. 6 depicts a block diagram illustrating an example of a computer system/server of a cloud based support system, to implement the system and processes described above with respect to FIGS. 1-5.

As shown in FIG. 6, host (602) is shown in the form of a general-purpose computing device. The components of host (602) may include, but are not limited to, one or more processors or processing units (604), e.g. hardware processors, a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to dynamically orchestrate of activities across one or more domains to identify vulnerabilities in an image build process. For example, the set of program modules (642) may include the tools (152)-(160) as described in FIG. 1.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
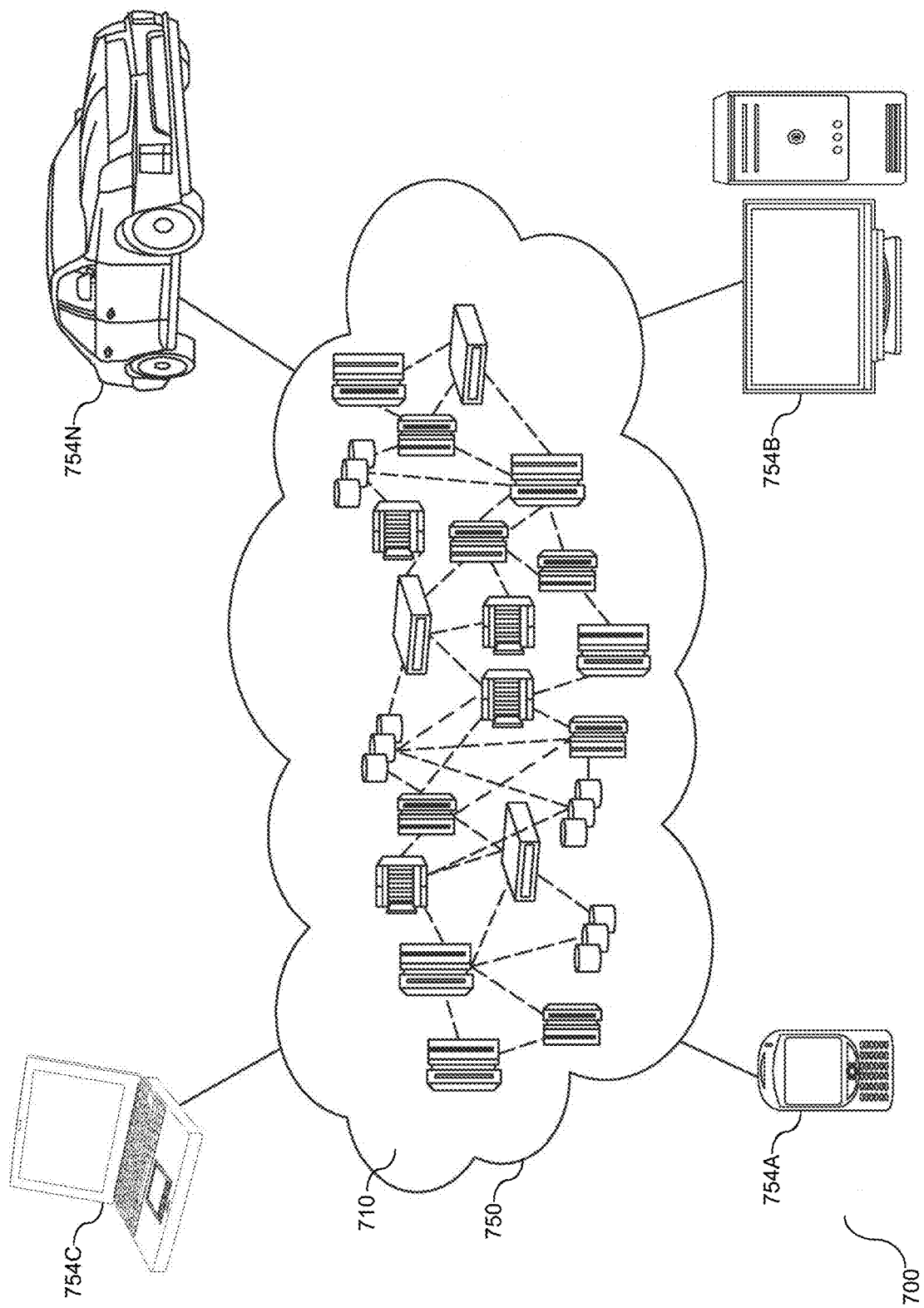
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
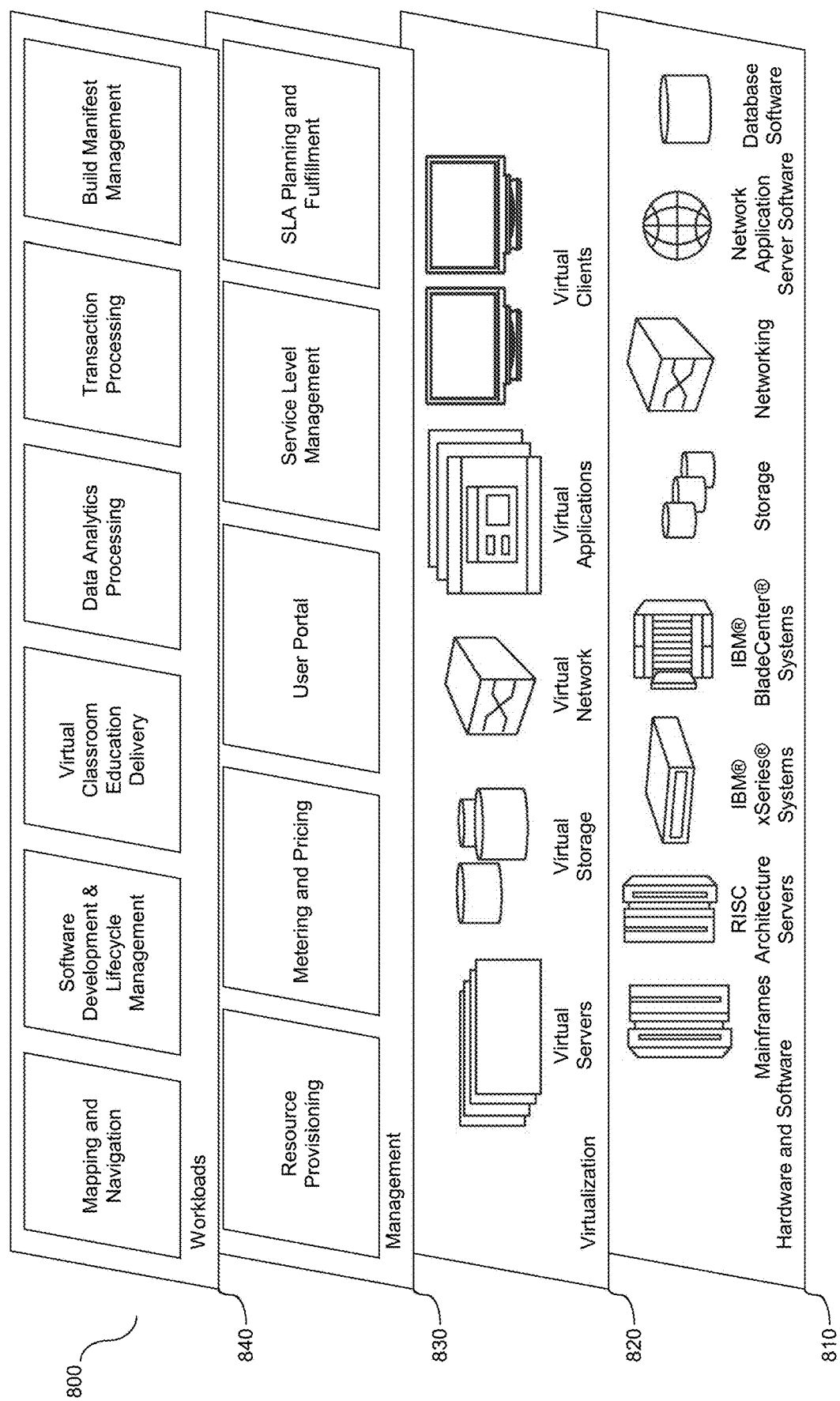
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and build manifest management.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to resolve orchestration of travel activities and meeting scheduling.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
   a processing unit operatively coupled to memory;
   a knowledge engine in communication with the processing unit, the knowledge engine to identify and apply one or more remedial measures to a build manifest, the knowledge engine comprising:
      a discovery manager to parse the build manifest to discover one or more actions in the build manifest determined to impact one or more operating system (O/S) packages that contribute to a final image build, wherein the build manifest is a document with commands to build a final image;
an image manager to execute the discovered one or more actions and create a partial image build leveraging a subset of resources in the build manifest, wherein non-leveraged resources remain in the build manifest, and wherein the partial image build requires fewer resources from the build manifest than the final image build;
a scan manager to scan the partial image build, including the scan manager to evaluate the partial image build against one or more vulnerabilities;
a remediation manager to identify and apply a remedial measure to the one or more identified vulnerabilities; and
the processing unit to execute the build manifest with the applied remedial measure to build the final image.

2. The system of claim 1, further comprising a structure manager to build an organized package structure including populate the organized package structure with one or more primary O/S packages, wherein the one or more primary O/S packages are identified by the discovery manager in the parsed build manifest.

3. The system of claim 2, further comprising for each primary O/S package, the structure manager to ascertain one or more secondary O/S packages called by the identified one or more primary O/S packages, and populate the organized package structure with one or more ascertained secondary O/S packages, wherein populating the structure includes an assignment of the ascertained one or more secondary O/S packages to its corresponding primary O/S package, wherein each secondary O/S packages is dependent from an O/S package selected.

4. The system of claim 3, further comprising the discovery manager to consult the build manifest and leverage the organized package structure to generate a list of O/S packages that contribute to the image build, the list including the one or more primary O/S packages and any associated secondary O/S packages present in the image, and the scan manager to review the generate list of O/S packages to identify vulnerabilities, including any associated secondary O/S packages present in the image.

5. The system of claim 4, wherein the list of O/S packages and any secondary O/S packages that contribute to the image build is generated without building the image.

6. The system of claim 4, wherein the list of O/S packages and any secondary O/S packages that contribute to the image build is generated without installing the O/S packages.

7. A computer program product to identify and apply one or more remedial measures to a build manifest, the computer program product comprising a computer readable storage medium having program code embodied therewith, the program code executable by a processor to:
parse the build manifest to discover one or more actions in the build manifest determined to impact one or more operating system (O/S) packages that contribute to a final image build, wherein the build manifest is a document with commands to build a final image;
execute the discovered one or more actions and create a partial image build leveraging a subset of resources in the build manifest, wherein non-leveraged resources remain in the build manifest, and wherein the partial image build requires fewer resources from the build manifest than the final image build;
scan the partial image build, including evaluate the partial image build against one or more vulnerabilities;
identify and apply a remedial measure to the one or more identified vulnerabilities; and
execute the build manifest with the applied remedial measure to build the final image.

8. The computer program product of claim 7, further comprising program code to build an organized package structure including populate the organized package structure with one or more primary O/S packages, wherein the one or more primary O/S packages are identified by the discovery manager in the parsed build manifest.

9. The computer program product of claim 8, further comprising for each primary O/S package, program code to ascertain one or more secondary O/S packages called by the identified one or more primary O/S packages, and populate the organized package structure with one or more ascertained secondary O/S packages, wherein populating the structure includes an assignment of the ascertained one or more secondary O/S packages to its corresponding primary O/S package, wherein each secondary O/S packages is dependent from an O/S package.

10. The computer program product of claim 9, further comprising program code to consult the build manifest and leverage the organized package structure to generate a list of O/S packages that contribute to the image build, the list including the one or more primary O/S packages any associated secondary O/S packages present in the image, and the program code to review the generate list of O/S packages to identify vulnerabilities, including any associated secondary O/S packages present in the image.

11. The computer program product of claim 10, wherein the list of O/S packages and any secondary O/S packages that contribute to the image build is generated without building the image.

12. The computer program product of claim 10, wherein the list of O/S packages and any secondary O/S packages that contribute to the image build is generated without installing the O/S packages.

13. A computer implemented method comprising:
discovering one or more actions in a build manifest that impact one or more operating system (O/S) packages that contribute to a final image build, including parsing the build manifest, wherein the build manifest is a document containing commands to build a final image;
executing the discovered one or more actions, the executed discovered one or more actions creating a partial image build leveraging a subset of resources in the build manifest, wherein non-leveraged resources remain in the build manifest, and wherein the partial image build requires fewer resources from the build manifest than the final image build;
scanning the partial image build, the scanning including evaluating the partial image build against one or more vulnerabilities;
identifying and applying a remedial measure to the one or more identified vulnerabilities, and executing the build manifest with the applied remedial measure to build the final image.

14. The method of claim 13, further comprising building an organized package structure including populating the organized package structure with one or more primary O/S packages, wherein the one or more primary O/S packages are identified in the parsed build manifest.

15. The method of claim 14, further comprising for each primary O/S package, ascertaining one or more secondary O/S packages called by the identified one or more primary O/S packages, and populating the organized package structure with one or more ascertained secondary O/S packages, wherein populating the structure includes assigning the ascertained one or more secondary O/S packages to its corresponding primary O/S package, wherein each secondary O/S packages is dependent from an O/S package.

16. The method of claim 15, further comprising consulting the build manifest and leveraging the organized package structure to generate a list of O/S packages that contribute to the image build, the list including the one or more primary O/S packages any associated secondary O/S packages present in the image, and scanning the generate list of O/S packages to identify vulnerabilities, the scanning including any associated secondary O/S packages present in the image.

17. The method of claim 16, wherein the list of O/S packages and any secondary O/S packages that contribute to the image build is generated without building the image.

18. The method of claim 16, wherein the list of O/S packages and any secondary O/S packages that contribute to the image build is generated without installing the O/S packages.

\* \* \* \* \*